United States Patent
Estock et al.

(10) Patent No.: US 9,894,837 B2
(45) Date of Patent: Feb. 20, 2018

(54) ADJUSTABLE WINDROW ASSEMBLY FOR AN AGRICULTURAL VEHICLE

(71) Applicant: CNH America LLC, New Holland, PA (US)

(72) Inventors: Nicholas A. Estock, Elizabethtown, PA (US); Nathan E. Isaac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 858 days.

(21) Appl. No.: 14/038,082

(22) Filed: Sep. 26, 2013

(65) Prior Publication Data
US 2014/0096498 A1    Apr. 10, 2014

Related U.S. Application Data

(60) Provisional application No. 61/744,830, filed on Oct. 4, 2012.

(51) Int. Cl.
| | | |
|---|---|---|
| *A01D 43/00* | (2006.01) | |
| *A01D 43/06* | (2006.01) | |
| *A01D 41/12* | (2006.01) | |

(52) U.S. Cl.
CPC ......... *A01D 43/06* (2013.01); *A01D 41/1243* (2013.01); *Y10T 74/20* (2015.01); *Y10T 74/20396* (2015.01)

(58) Field of Classification Search
CPC ..... A01D 41/1243; A01D 43/06; A01F 12/40; A01F 12/44; A01F 12/444
USPC ............................................ 460/111; 56/192
See application file for complete search history.

(56) References Cited

U.S. PATENT DOCUMENTS

| | | | | |
|---|---|---|---|---|
| 1,080,397 | A | | 12/1913 | Willis |
| 1,777,930 | A | | 10/1930 | McArtor |
| 2,553,310 | A | | 5/1951 | Gransden |
| 2,670,775 | A | * | 3/1954 | Elofson ................... A01F 12/40 239/650 |
| 2,708,582 | A | * | 5/1955 | Adams .................... A01F 12/40 239/650 |
| 2,810,583 | A | * | 10/1957 | Elofson ................... A01F 12/40 239/650 |
| 2,854,046 | A | * | 9/1958 | Devorak ............ A01D 41/1243 56/192 |
| 2,865,416 | A | * | 12/1958 | Hetteen .................. A01F 12/40 239/679 |
| 3,059,403 | A | * | 10/1962 | Bamford ................ A01D 78/02 56/192 |

(Continued)

FOREIGN PATENT DOCUMENTS

EP          0212270 A1 *  3/1987  ......... A01D 41/1243

*Primary Examiner* — Thomas B Will
*Assistant Examiner* — Joan D Misa
(74) *Attorney, Agent, or Firm* — Patrick M. Sheldrake (57) ABSTRACT

An agricultural vehicle includes a chassis and a windrow assembly carried by the chassis. The windrow assembly includes a windrow chute and a width adjustment device operatively mounted to the windrow chute. The windrow chute includes a discharge panel and a pair of side walls attached and movable relative to the discharge panel. The width adjustment device includes a manual adjustment member mounted to the discharge panel, and a pair of linkages with each linkage interconnecting between the manual adjustment member and a respective side wall.

20 Claims, 5 Drawing Sheets

(56) References Cited

U.S. PATENT DOCUMENTS

| | | | | |
|---|---|---|---|---|
| 3,186,460 | A * | 6/1965 | Frederick | A01F 12/40 100/906 |
| 3,350,017 | A * | 10/1967 | Howell | A01F 12/40 239/650 |
| 3,523,410 | A * | 8/1970 | Taylor | A01D 43/105 280/473 |
| 3,722,191 | A * | 3/1973 | Braunberger | A01D 34/28 56/189 |
| 3,841,070 | A * | 10/1974 | Scarnato | A01D 84/00 56/14.4 |
| 3,911,649 | A | 10/1975 | Scarnato et al. | |
| 4,218,022 | A * | 8/1980 | Boehm | A01F 12/40 241/101.75 |
| 4,532,941 | A * | 8/1985 | Gauthier | A01F 12/40 241/243 |
| 4,813,214 | A * | 3/1989 | Barnard | F16C 1/18 180/19.3 |
| 4,921,469 | A * | 5/1990 | Scharf | A01D 41/1243 460/10 |
| 5,569,081 | A * | 10/1996 | Baumgarten | A01D 41/1243 460/1 |
| 5,930,988 | A | 8/1999 | Hanson | |
| 6,602,131 | B2 | 8/2003 | Wolters | |
| 6,719,627 | B2 | 4/2004 | Wolters et al. | |
| 6,840,853 | B2 * | 1/2005 | Foth | A01F 12/40 460/111 |
| 6,860,805 | B2 * | 3/2005 | Kuhn | A01D 41/1243 460/111 |
| 6,976,913 | B2 * | 12/2005 | Duquesne | A01D 41/1243 460/111 |
| 7,063,613 | B2 * | 6/2006 | Weichholdt | A01F 12/40 460/112 |
| 7,156,732 | B2 | 1/2007 | Kuhn et al. | |
| 7,220,179 | B2 * | 5/2007 | Redekop | A01D 41/1243 460/112 |
| 7,261,633 | B2 * | 8/2007 | Benes | A01D 41/1243 460/111 |
| 7,559,833 | B2 | 7/2009 | Isaac et al. | |
| 7,635,299 | B2 * | 12/2009 | Murray | A01D 41/1243 460/111 |
| 8,010,262 | B2 * | 8/2011 | Schroeder | A01D 41/1243 701/50 |
| 8,443,580 | B2 * | 5/2013 | Matousek | A01F 15/0825 56/341 |
| 2006/0123764 | A1 * | 6/2006 | McLean | A01D 43/04 56/350 |
| 2008/0188275 | A1 * | 8/2008 | Mayerle | A01D 41/1243 460/111 |
| 2008/0268927 | A1 * | 10/2008 | Farley | A01D 41/1243 460/111 |
| 2011/0302897 | A1 * | 12/2011 | Hoffman | A01D 43/10 56/192 |

\* cited by examiner

ADJUSTABLE WINDROW ASSEMBLY FOR AN AGRICULTURAL VEHICLE

CROSS REFERENCE TO RELATED APPLICATIONS

This is a non-provisional application based upon U.S. provisional patent application Ser. No. 61/744,830, entitled "QUICK ADJUST WINDOW CHUTE", filed Oct. 4, 2012, which is incorporated herein by reference.

BACKGROUND OF THE INVENTION

1. Field of the Invention

The present invention relates to agricultural vehicles such as combines, and, more particularly, to agricultural vehicles that include a windrow assembly.

2. Description of the Related Art

An agricultural vehicle known as a harvester "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent to a vehicle into which the grain is to be unloaded, such as a semi-trailer, gravity box, straight truck, or the like; and an unloading system on the combine is actuated to transfer the grain into the vehicle.

Although it is common to chop and distribute the non-grain crop material back to the field, it is also common to deposit the non-grain crop material in windrows at the back of the combine which are subsequently picked up and further processed. For example, the windrowed non-grain crop material may be picked up with a large square or round baler and fed to livestock. As another example, the non-grain crop material may be picked up with a biomass harvester and transported to an offsite location for production of biomass fuel, such as ethynol.

Other types of agricultural vehicles also use windrower assemblies. Examples include a windrower or a haybine. A windrower is typically a self-propelled vehicle that cuts the crop material, such as hay, and deposits the crop material in windrows at the rear of the machine. A haybine is typically a towed implement which cuts the crop material, such as hay, crimps the crop material using counter-rotating conditioning rolls, and deposits the cut and conditioned crop material at the rear of the machine.

Regardless of the specific type of windrowing machine, it is desirable to be able to adjust the width of the windrow. The wider the windrow, the quicker the crop material can dry. On the other hand, if the crop is already dry, it may be desirable to place the crop material in a tight windrow so that it can be directly picked up without the need to consolidate the windrow using a rake or the like. With a windrower or haybine, the entire rear hood behind the cutting mechanism can typically be raised or lowered to adjust the windrow width. With a combine, a windrow assembly in an inverted position may have a more complicated width adjusting mechanism.

SUMMARY OF THE INVENTION

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

The subject application provides a windrow assembly having a windrow chute with side panels and a simple adjustment mechanism for moving the side panels in an out, and thereby adjusting the width of the windrow. In the illustrated embodiment, the width of the windrow is adjusted. It is to be understood that the present application can be used to adjust other dimensions of the windrow chute.

The subject application in one form is directed to an agricultural vehicle including a chassis and a windrow assembly carried by the chassis. The windrow assembly includes a windrow chute and a width adjustment device operatively mounted to the windrow chute. The windrow chute includes a discharge panel and a pair of side walls attached and movable relative to the discharge panel. The width adjustment device includes a manual adjustment member mounted to the discharge panel, and a pair of linkages with each linkage interconnecting between the manual adjustment member and a respective side wall.

The subject application in another form is directed to a windrow assembly for use on an agricultural vehicle. The windrow assembly includes a windrow chute and width adjustment device. The windrow chutes includes a discharge panel and a pair of side walls attached and movable relative to the discharge panel. The width adjustment device includes a manual adjustment member mounted to the discharge panel, and a pair of linkages with each linkage interconnecting between the manual adjustment member and a respective side wall.

An advantage of the subject application is that the width of the windrow assembly can be easily adjusted using a manual handle.

Another advantage is that the desired width of the windrow assembly is maintained using a detent arrangement, without the need for further locking or clamping mechanisms.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
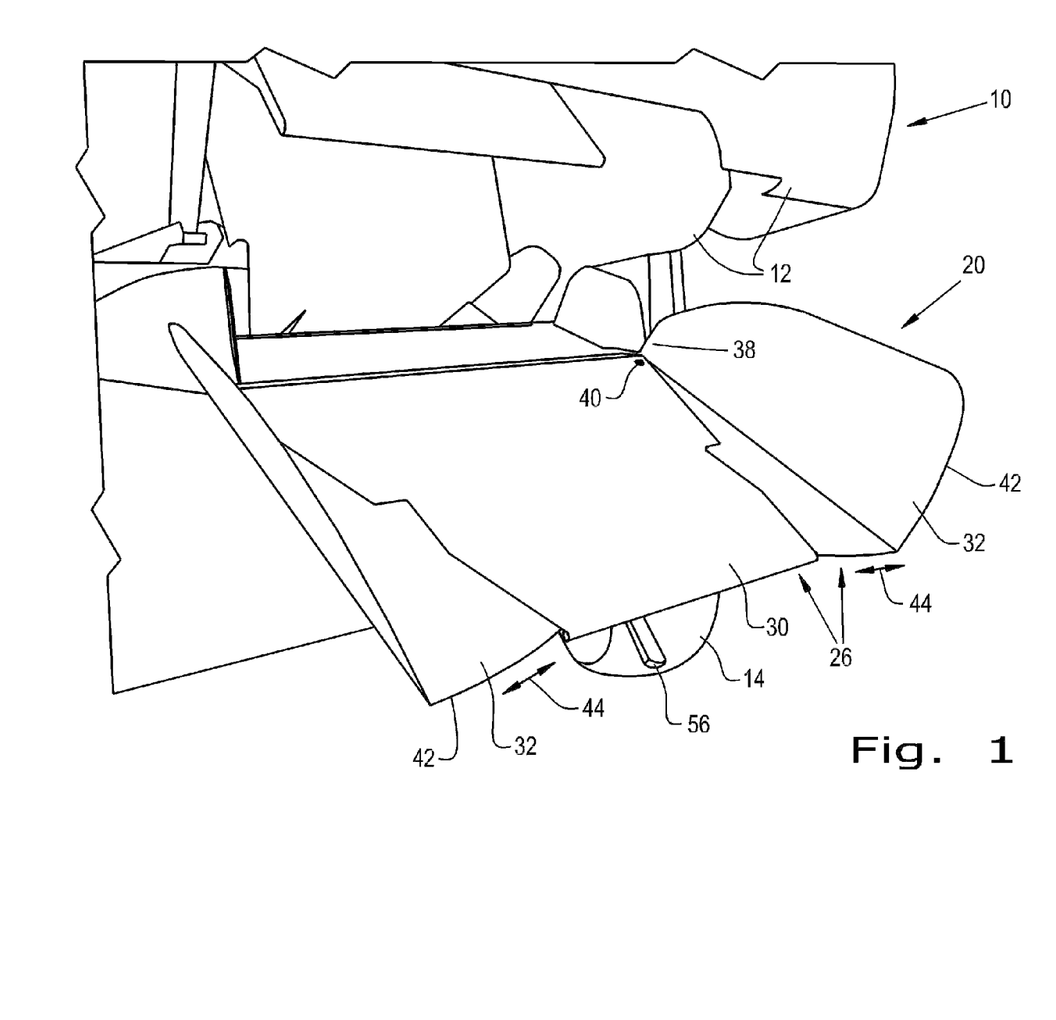
FIG. 1 is a rear perspective view of a portion of an agricultural vehicle in the form of a combine which includes an embodiment of a windrow assembly of the present invention.

Referring now to the drawings, and more particularly to FIG. 1, there is shown a portion of an agricultural vehicle in the form of a combine 10. It is to be appreciated that the agricultural vehicle could be any type of self-propelled or towed agricultural vehicle, such as a windrower or haybine, depending on the need or application.

Combine 10 generally includes a chassis 12 which carries a number of conventional components and systems, such as a header, operator station, threshing and separating system, cleaning system, grain tank, unloading auger, etc (not shown). Motive force can typically be applied through a number of ground engaging wheels, including a rear wheel 14 shown in FIG. 1. It may also be possible to use driven tracks (half or full) for some applications. The chassis 12 can be broadly defined to include both the structural framework as well as the sheet metal or covering of combine 10.

According to an aspect of the present invention, and referring to FIGS. 1-5 conjunctively, a windrow assembly 20 at the rear of combine 10 deposits the non-grain crop material 22 in windrows 24. The width of the windrows 24 depends on the adjusted width "W" of windrow assembly 20 (compare FIGS. 3 and 4).

Figure 2:
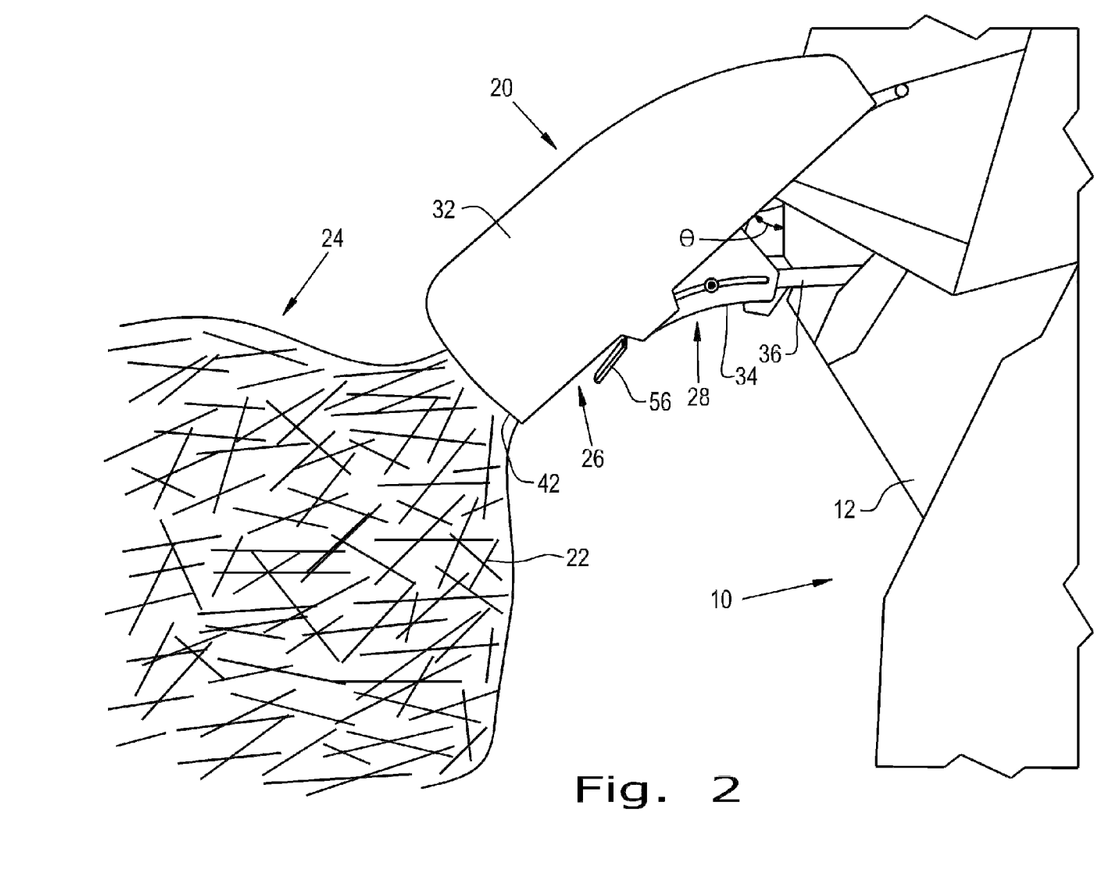
FIG. 2 is a side view showing the windrow assembly of FIG. 1.
Figure 3:
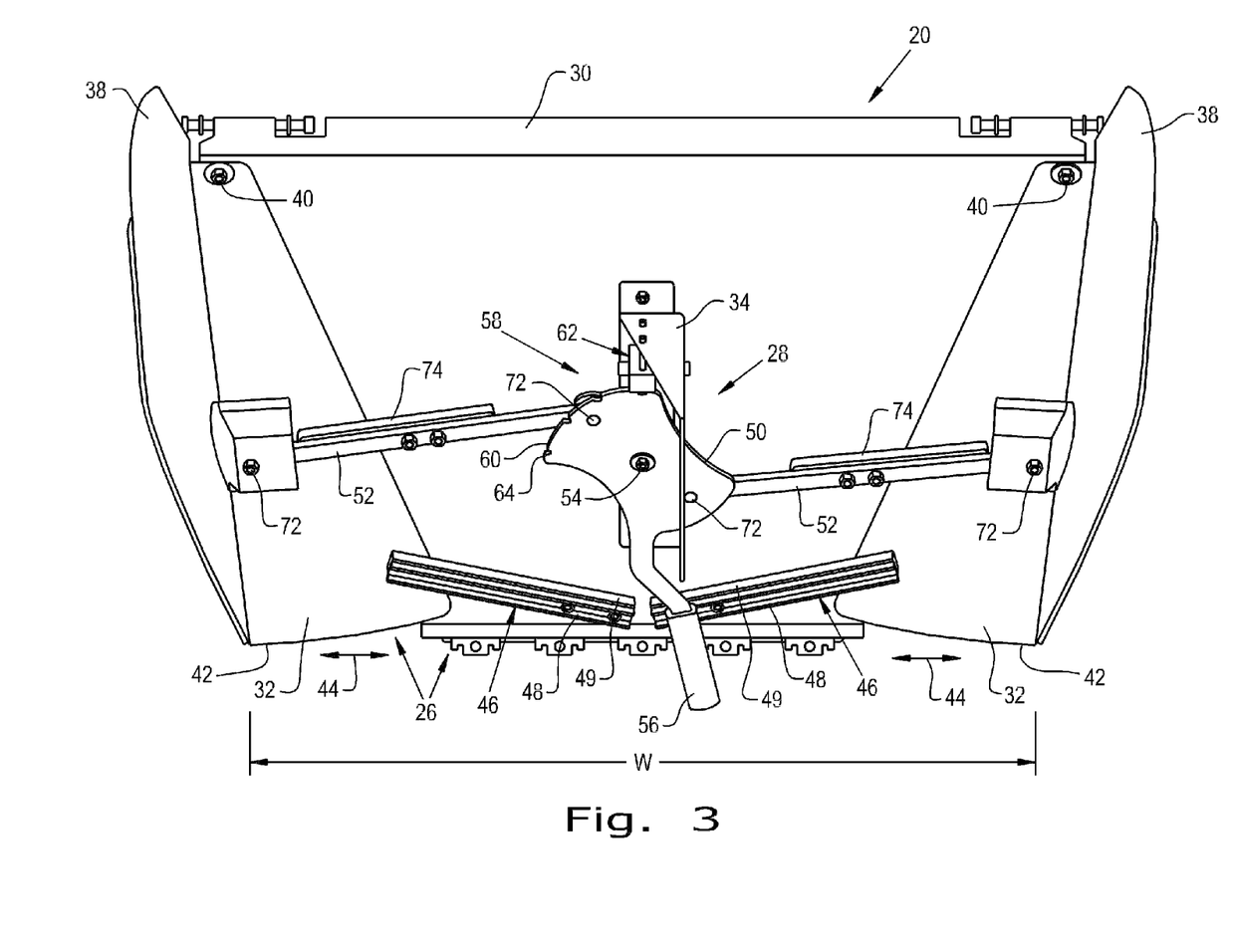
FIG. 3 is a bottom perspective view of the windrow assembly shown in FIGS. 1 and 2, with the side walls at the widest position.
Figure 4:
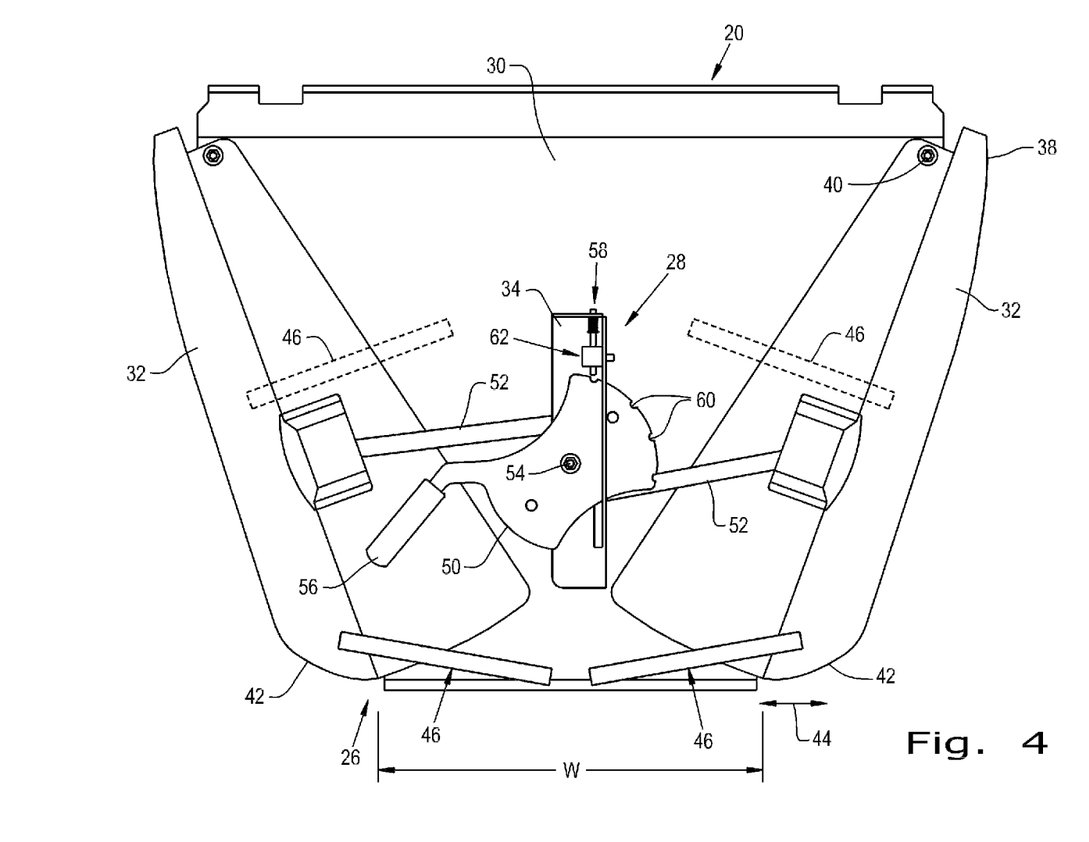
FIG. 4 is another bottom perspective view of the windrow assembly shown in FIGS. 1-3, with the side walls at the narrowest position.

More particularly, windrow assembly 20 can be carried by chassis 12 and includes a windrow chute 26 and a width adjustment device 28 (FIGS. 2-4). Windrow chute 26 includes a discharge panel 30 and a pair of side walls 32 which are attached and movable relative to discharge panel 30. Windrow chute 26 can be positioned in an inverted position with the discharge panel 30 at the bottom of windrow chute 26 such that the crop material can be deposited directly onto discharge panel 30. Discharge panel 30 can be formed as a sheet metal panel, and can be hinged at the leading edge thereof. A bracket 34 mounted to the bottom of discharge panel 30 can be adjustably connected with an arm 36 attached to chassis 12, and provides an adjustable discharge angle θ of windrow chute 26.

Side walls 32 extend upwardly from discharge panel 30 and inhibit the crop material from flowing over the sides of windrow chute 26. Side walls 32 have a generally L-shaped cross-section with an inlet end 38 which can be pivotally attached to discharge panel 30 using a fastener such as a bolt 40. Each side wall 32 also has a discharge end 42 which can be movable laterally inward and outward relative to discharge panel 30, as indicated by double headed arrows 44. In the illustrated embodiment, side walls 32 are configured as sheet metal walls lying adjacent to the bottom side of discharge panel 30.

One or more slide members 46 are attached to the bottom of discharge panel 30 and hold the side walls 32 adjacent to discharge panel 30 during lateral inward and outward movement of side walls 32. Each slide member 46 defines a slight gap such that the side walls 32 can slide within the space between slide members 46 and discharge panel 30. Slide members 46 are configured with a metal backer 48 and a friction reducing strip 49 adjacent to discharge panel 30 (FIG. 3). The metal backer 48 provides structural rigidity to slide member 46, and the friction reducing strip 49, such as nylon or plastic, allows the associated side wall 32 to slide back and forth with reduced friction. In FIGS. 3 and 4, two slide members 46 are utilized. It is also possible to use a different number of slide members 46. For example, a single slide member 46 can extend across the discharge end of discharge panel 30. Moreover, the position of the one or more slide members 46 can vary, such as the alternate position of slide members 46 shown in dashed lines in FIG. 4.

Width adjustment device 28 includes a manual adjustment member 50 and a pair of linkages 52. Manual adjustment member 50 can be mounted to and movable with respect to discharge panel 30. In the illustrated embodiment, manual adjustment member 50 can be configured as a plate which can be rotatably mounted to discharge panel 30 using a bolt 54. Manual adjustment member 50 includes a handle 56 which extends rearwardly toward the discharge end of discharge panel 30. Handle 56 allows an operator to easily grasp and rotate manual adjustment member 50 to a selected position.

A detent arrangement 58 holds the manual adjustment member 50 at a selected position corresponding to a desired width W of windrow chute 26. Detent arrangement 58 includes a plurality of notches 60 formed in manual adjustment member 50, and a spring-loaded projection 62 positioned adjacent to manual adjustment member 50. The notches 60 are formed in an edge 64 of manual adjustment member 50. Notches 60 could also be differently configured, such as openings or depressions extending transversely into the plate defining manual adjustment member 50.

Figure 5:
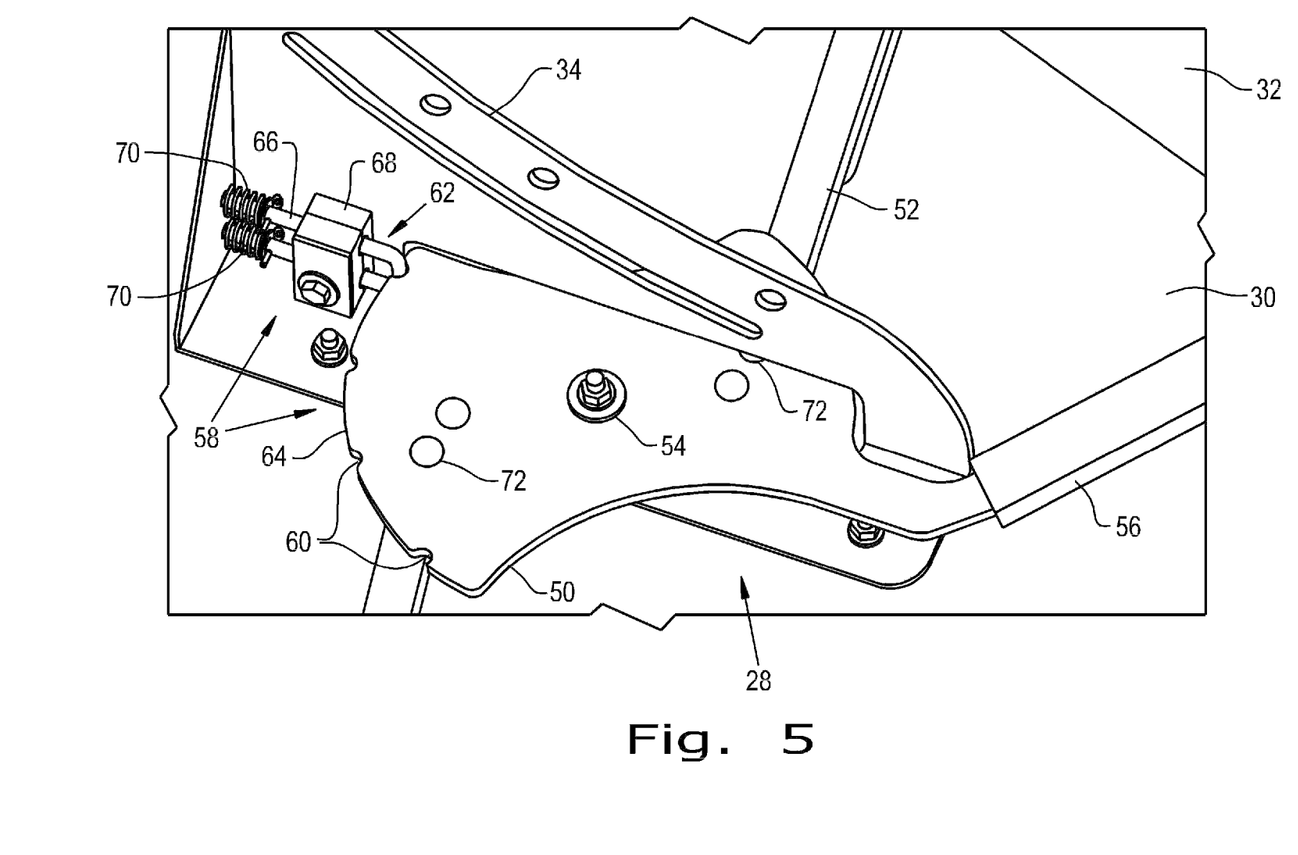
FIG. 5 is a perspective view of the width adjustment device used with the windrow assembly shown in FIGS. 1-4.

Spring-loaded projection 62, shown more clearly in FIG. 5, includes a generally U-shaped member 66 which slides within openings formed in a mounting block 68. Mounting block 68 can be attached to bracket 34, and springs 70 bias the U-shaped member 66 toward manual adjustment member 50. Spring-loaded projection 62 can also be differently configured, such as a spring biased pin or the like.

Each linkage 52 interconnects between the manual adjustment member 50 and a respective side wall 32. Linkages 52 function to pivotally move the side walls 32 laterally inward and outward as manual adjustment member 50 can be manually rotated to a selected position. Each linkage 52 can be attached at opposite ends with the manual adjustment member 50 and a respective side wall 32 using fasteners such as bolts 72. The bolts 72 are attached using lock nuts so that they need not be completely tightened and are free to pivot at the respective connection points. Each linkage also includes a friction reducing member 74 on a side adjacent to discharge panel 30. In the illustrated embodiment, the friction reducing member 74 can be a nylon or plastic strip.

During operation of combine 10, discharge chute 26 can be positioned at a selected discharge angle θ by adjusting bracket 34 and arm 36. The width of windrow chute 26 can be adjusted by grasping handle 56 and rotating manual adjustment member 50 to a selected position, which can be a position corresponding to one of the notches 60, or a selected position between the notches 60, or a predetermined number of rotations (or partial rotations) of manual adjustment member 50. Application of a manual force on handle 56 results in a torque on manual adjustment member 50, which in turn results in an axial force exerted by the linkages 52 on side walls 32. The selected position of windrow chute 26 can then be held in place with detent arrangement 58, or another suitable mechanism. Windrow chute 26 may be manually configured with the widest width W shown in FIG. 3, the narrowest width W shown in FIG. 4, or any other selected width therebetween.

In the embodiment illustrated in the drawings, manual adjustment member 50 can be configured as a plate which can be rotatably mounted to discharge panel 30. Manual adjustment member 50 may be differently configured. For example, manual adjustment member 50 may be formed as a plate which slides within parallel brackets mounted to the bottom of discharge panel 30. As the plate slides back and forth, the linkages 52 move the side walls 32 laterally inward and outward. A similar detent arrangement could be used along the side edge of the sliding plate to hold the sliding plate at a desired position.

Moreover, in the illustrated embodiment, the side walls 32 are pivotally movable laterally inward and outward relative to the discharge panel 30. The side walls 32 can be differently configured and/or attached to discharge panel 30, and still provide the adjustable windrow width as described above. For example, the side walls 32 can be connected via a hinged connection to the discharge panel and pivoted about the hinge using a width adjustment device as described above. With a hinged connection, the linkages 52 would then be connected with the upstanding portion of the side walls. As another option, the side walls 32 could be formed from a flexible plastic sheet or the like, and each linkage could be connected with the laterally outer portion of the flexible side wall and change the radius of curvature of the side wall as it moves laterally inward and outward. Other design configurations are also possible.

Further, in the embodiment illustrated herein, the manual adjustment member 50 includes a handle 56 allowing manual adjustment of a predetermined dimension (e.g., width) of windrow chute 26. It is to be appreciated that it may also be possible to provide an automatic or semi-automatic adjustment of manual adjustment member 50 using a suitable actuator, such as a hydraulic, electric or other actuator.

Additionally, in the illustrated embodiment, the width adjustment device 28 includes a manual adjustment member 50 in the form of a rotatable plate 50 with the two linkages 52 mounted on opposite ends of the plate 50 (i.e., one linkage 52 mounted adjacent to handle 56 and the other linkage 52 mounted adjacent to the notches 60). It is to be appreciated that the linkages 52 can also be mounted adjacent to the same end of the plate 50, in which event rotation of plate 50 using handle 56 causes a shifting of the windrow to one side or the other, rather than a width adjustment of the windrow. That is, with the linkages connected to the same end of disk 50, rotation of disk 50 causes one side wall 32 to move toward the widest position while the other side wall 32 moves toward the narrowest position. The term "width adjustment device" is thus used in the broadest sense of the term, with the width of the windrow potentially be widened or narrowed, or shifted from side to side.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
a chassis; and
a windrow assembly carried by said chassis, said windrow assembly including a windrow chute and a width adjustment device operatively mounted to said windrow chute, said windrow chute including a discharge panel and a pair of side walls attached and movable relative to said discharge panel, said pair of side walls defining a width of said windrow chute therebetween, said width adjustment device including a manual adjustment member rotatably or slidably mounted to said discharge panel, and a pair of linkages with each said linkage interconnecting between said manual adjustment member and a respective said side wall such that rotation or sliding of said manual adjustment member relative to said discharge panel causes a change in said width of said windrow chute, each of said side walls comprising a first portion and a second portion connected and extending transversely to said first portion, each said first portion overlapping a respective side edge of said discharge panel to form a generally continuous surface with said discharge panel.

2. The agricultural vehicle of claim 1, wherein said manual adjustment member comprises a plate.

3. The agricultural vehicle of claim 2, wherein said plate includes a handle extending therefrom.

4. The agricultural vehicle of claim 2, further including a detent arrangement associated with said plate for holding said plate in a selected position.

5. The agricultural vehicle of claim 4, wherein said detent arrangement includes a plurality of notches formed in said plate, and a spring loaded projection positioned adjacent to said plate.

6. The agricultural vehicle of claim 5, wherein said plurality of notches are formed in an edge of said plate.

7. The agricultural vehicle of claim 1, wherein each said side wall has a generally L-shaped cross section with an inlet end which is pivotally attached to said discharge panel and a discharge end which is movable laterally inward and outward relative to said discharge panel, and further including at least one slide member which is attached to said discharge panel and holds said side walls adjacent to said discharge panel during said laterally inward and outward movement.

8. The agricultural vehicle of claim 1, wherein said windrow chute is positioned in an inverted position with said discharge panel at a bottom of said windrow chute, and said side walls extending upwardly from said discharge panel.

9. The agricultural vehicle of claim 1, wherein each said linkage includes a friction reducing member on a side adjacent to said discharge panel.

10. The agricultural vehicle of claim 9, wherein said each said friction reducing member is a nylon strip or plastic strip.

11. The agricultural vehicle of claim 1, wherein each said linkage is attached at opposite ends with said manual adjustment member and a respective said side wall using fasteners.

12. The agricultural vehicle of claim 1, wherein said agricultural vehicle is a combine.

13. A windrow assembly for use on an agricultural vehicle, said windrow assembly comprising:
    a windrow chute including a discharge panel and a pair of side walls attached and movable relative to said discharge panel, said pair of side walls defining a width of said windrow chute therebetween; and
    a width adjustment device including a manual adjustment member rotatably or slidably mounted to said discharge panel, and a pair of linkages with each said linkage interconnecting between said manual adjustment member and a respective said side wall such that rotation or sliding of said manual adjustment member relative to said discharge panel causes a change in said width of said windrow chute, each of said side walls comprising a first portion and a second portion connected and extending transversely to said first portion, each said first portion overlapping a respective side edge of said discharge panel to form a generally continuous surface with said discharge panel.

14. The windrow assembly of claim 13, wherein said manual adjustment member comprises a plate.

15. The windrow assembly of claim 14, wherein said plate includes a handle extending therefrom.

16. The windrow assembly of claim 14, further including a detent arrangement associated with said plate for holding said plate in a selected position.

17. The windrow assembly of claim 16, wherein said detent arrangement includes a plurality of notches formed in said plate, and a spring loaded projection positioned adjacent to said plate.

18. The windrow assembly of claim 13, wherein each said side wall has a generally L-shaped cross section with an inlet end which is pivotally attached to said discharge panel and a discharge end which is movable laterally inward and outward relative to said discharge panel, and further including at least one slide member which is attached to said discharge panel and holds said side walls adjacent to said discharge panel during said laterally inward and outward movement.

19. The windrow assembly of claim 13, wherein said windrow chute is positioned in an inverted position with said discharge panel at a bottom of said windrow chute, and said side walls extending upwardly from said discharge panel.

20. The windrow assembly of claim 13, wherein each said linkage includes a friction reducing member on a side adjacent to said discharge panel.

* * * * *